United States Patent
Kamath et al.

(10) Patent No.: US 12,087,949 B2
(45) Date of Patent: Sep. 10, 2024

(54) SACRIFICIAL SALTS IN Li-RICH, DEFECT ANTI-FLUORITE COMPOUNDS IN CATHODES FOR PRELITHIATION IN LITHIUM ION BATTERIES

(71) Applicant: Enevate Corporation, Irvine, CA (US)

(72) Inventors: Rahul Kamath, Mission Viejo, CA (US); Frederic Bonhomme, Lake Forest, CA (US); Qian Huang, San Diego, CA (US); Heidi Anderson, Irvine, CA (US); Ian Browne, Orange, CA (US); David J. Lee, Irvine, CA (US); Sanjaya Perera, Irvine, CA (US); Younes Ansari, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 13 days.

(21) Appl. No.: 16/682,938

(22) Filed: Nov. 13, 2019

(65) Prior Publication Data
US 2021/0143426 A1     May 13, 2021

(51) Int. Cl.
*H01M 4/62*     (2006.01)
*H01M 4/04*     (2006.01)
*H01M 4/36*     (2006.01)
*H01M 4/38*     (2006.01)

(52) U.S. Cl.
CPC ........... *H01M 4/62* (2013.01); *H01M 4/0404* (2013.01); *H01M 4/366* (2013.01); *H01M 4/386* (2013.01)

(58) Field of Classification Search
CPC .................................................... H01M 4/366
See application file for complete search history.

(56) References Cited

U.S. PATENT DOCUMENTS

| | | | |
|---|---|---|---|
| 2006/0121352 A1 | 6/2006 | Kejha et al. | |
| 2009/0081529 A1 | 3/2009 | Thackeray et al. | |
| 2009/0202905 A1* | 8/2009 | Morita | H01M 4/131 429/212 |
| 2013/0298386 A1 | 11/2013 | Tarascon et al. | |
| 2015/0364795 A1* | 12/2015 | Stefan | H01M 10/0569 429/188 |
| 2016/0260965 A1* | 9/2016 | Wu | H01M 4/62 |
| 2016/0372784 A1 | 12/2016 | Hayner et al. | |
| 2017/0170477 A1* | 6/2017 | Sakshaug | C04B 38/0051 |
| 2017/0309914 A1 | 10/2017 | Drews et al. | |
| 2017/0352915 A1* | 12/2017 | Katagiri | H01M 4/622 |
| 2018/0040898 A1* | 2/2018 | Lee | H01M 4/133 |
| 2018/0198114 A1* | 7/2018 | Bonhomme | H01M 4/0404 |
| 2018/0219250 A1 | 8/2018 | Delobel et al. | |
| 2018/0277851 A1* | 9/2018 | You | H01M 4/628 |

(Continued)

FOREIGN PATENT DOCUMENTS

WO     2020132622 A1     6/2020

OTHER PUBLICATIONS

Lithium Oxalate; www.pubchem.com (Year: 2020).*

(Continued)

*Primary Examiner* — Victoria H Lynch
(74) *Attorney, Agent, or Firm* — McAndrews, Held & Malloy, Ltd.

(57) ABSTRACT

Systems and methods for batteries comprising a cathode, an electrolyte, and an anode, wherein sacrificial salts and prelithiation reagents are added to the cathode as functional additives for electrochemical prelithiation.

5 Claims, 14 Drawing Sheets

(56) References Cited

U.S. PATENT DOCUMENTS

2018/0315995 A1* 11/2018 Reynier ................ H01M 4/405
2019/0267614 A1*  8/2019 Lee ..................... H01M 4/0471

OTHER PUBLICATIONS

International Search Report, PCT/US2020/058324, dated Feb. 26, 2021, 9 pages.
Su et al., A New Strategy to Mitigate the Initial Capacity Loss of Lithium Ion Batteries, Journal of Power Systems, vol. 324, dated Aug. 30, 2016, pp. 150-157.
International Preliminary Report on Patentability, International Application No. PCT/US2020/058324, dated May 27, 2022, 8 pages.

* cited by examiner

SACRIFICIAL SALTS IN Li-RICH, DEFECT ANTI-FLUORITE COMPOUNDS IN CATHODES FOR PRELITHIATION IN LITHIUM ION BATTERIES

TECHNICAL FIELD

Aspects of the present disclosure relate to energy generation and storage. More specifically, certain embodiments of the disclosure relate to a method and system for using sacrificial salts in cathodes for prelithiation in lithium ion batteries.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using sacrificial salts in cathodes for prelithiation in lithium ion batteries, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 8A shows specific discharge capacity and FIG. 8B shows capacity retention.

FIG. 9A shows specific discharge capacity and FIG. 9B shows capacity retention.

DETAILED DESCRIPTION

Figure 1:
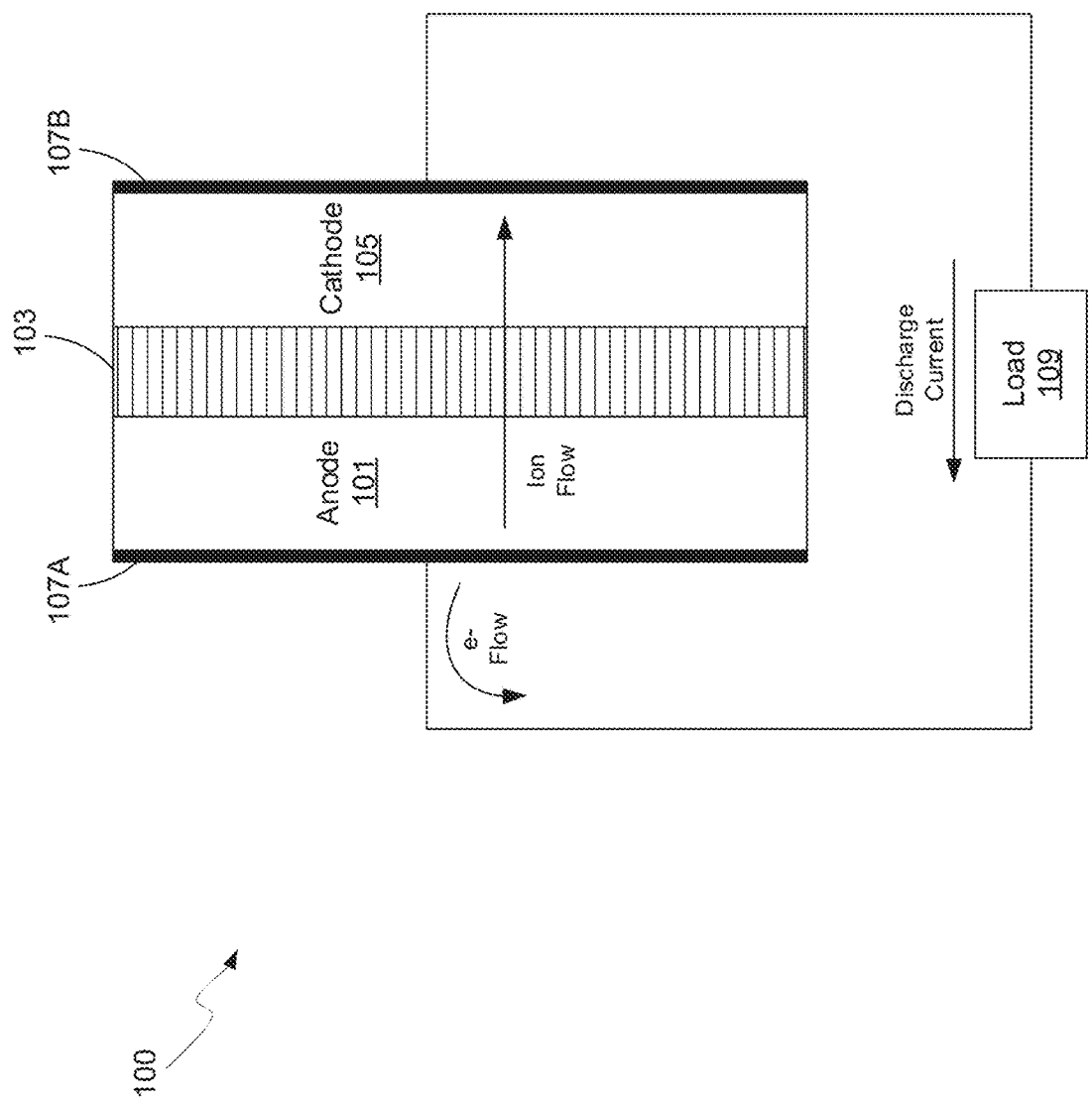
FIG. 1 is a diagram of a battery with anode expansion configured via silicon particle size, in accordance with an example embodiment of the disclosure.

FIG. 1 is a diagram of a battery made using sacrificial salts in the cathode for prelithiation, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

As discussed above, the increasing necessity to develop high performance electrochemical energy storage is driven by the rapid development of portable electronic devices and electrification of transportation. Lithium-ion batteries have received a lot of attention from small scale (<100 Wh) to large scale (>10 KWh) applications due to their high performance properties when compared with other rechargeable battery chemistries. To meet this increasing demand, the next energy storage technologies need advance materials with high volumetric and gravimetric capacities. However, most of these materials suffer from high first cycle active lithium losses, e.g., caused by solid electrolyte interphase (SEI) formation, which in turn hinder their broad commercial use to date. In general, although silicon is a promising next-generation anode material for lithium-ion batteries due to its high capacity, it suffers from loss of large initial capacity during first cycle resulting in loss of initial Li inventory required to complete irreversible electrochemical reactions. The loss of active lithium permanently decreases the available energy by the consumption of lithium from the positive electrode material. Prelithiation is a solution to compensate for active lithium losses and, therefore, to increase the practical energy density. The inventors have discovered that prelithiation using a lithium salt as a sacrificial salt in the cathode where salt can be oxidized during first charge, acts as a lithium reservoir.

Prelithiation is pre-doping of lithium ions. In a prelithiation process additional lithium is added to the reversible active lithium content present in lithium ion batteries. In a "standard" lithium ion cell set-up, the active lithium content is stored within the positive electrode (cathode). During the first charge of the cell (formation cycle), a certain amount of active lithium is typically lost, mostly by SEI formation, at the negative electrode, depending on the electrode active material, so that the remaining active lithium content is reduced after the first charge/discharge cycle. One major strategy to overcome this issue is to store a certain amount of active lithium in the negative electrode by prelithiation prior to charge/discharge cycling. This (partially) compensates for the active lithium lost and thus leads to an increased active lithium content after the first cycle and, thus, to an enhanced remaining cell energy. However, the prelithiation concept is not limited to the negative electrode; it is also possible to use prelithiation additives inside the positive electrode as demonstrated by the inventors. In most cases (independent from the pre-treatment concept), prelithiation is conducted to compensate the first cycle active lithium loss, attributed mainly to SEI formation [Holtstiege et al].

Figure 2:
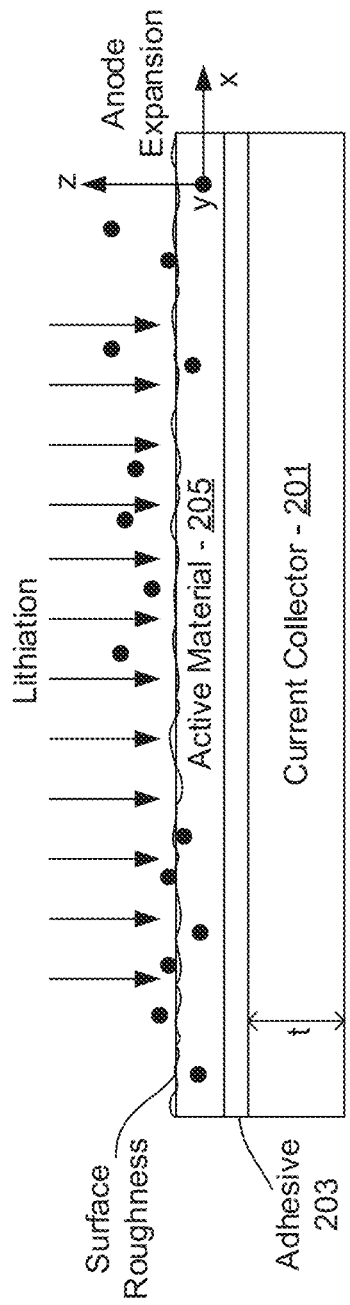
FIG. 2 illustrates anode expansion during lithiation, in accordance with an example embodiment of the disclosure.

FIG. 2 illustrates anode expansion during lithiation, in accordance with an example embodiment of the disclosure. Referring to FIG. 2, there are shown a current collector 201, an optional adhesive 203, and an active material 205. It should be noted that the adhesive 203 may or may not be present depending on the type of anode fabrication process utilized, as the adhesive is not necessarily there in a direct coating process where the active material is formed directly on the current collector. In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205. The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 6 μm, such as 10 μm or 20 μm for copper, for example, while thinner foils may be less than 6 μm thick in copper.

In another example scenario, when the current collector 201 is thinner, on the order of 5-6 μm for a copper foil, for example, the active material 205 may expand more easily in the x- and y-directions, although still even more easily in the z-direction without other restrictions in that direction. In this case, the expansion is anisotropic, but not as much as compared to the case of higher x-y confinement.

In addition, different materials with different tensile strength may be utilized to configure the amount of expansion allowed in the x- and y-directions. For example, nickel is a more rigid, mechanically strong metal for the current collector 201, and as a result, nickel current collectors confine x-y expansion when a strong enough adhesive is used. In this case, the expansion in the x- and y-directions may be more limited, even when compared to a thicker copper foil, and result in more z-direction expansion, i.e., more anisotropic. In anodes formed with 5 μm nickel foil current collectors, very low expansion and no cracking results. Furthermore, different alloys of metals may be utilized to obtain desired thermal conductivity, electrical conductivity, and tensile strength, for example.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

In an example embodiment of the disclosure, a method and system is described for using sacrificial salts in cathodes for prelithiation in lithium ion batteries. The disclosure describes a prelithiation approach to improve the cycle life performance of lithium-ion batteries with silicon dominated anodes. The sacrificial salts have the general formula $Li_2C_xO_y$.

The sacrificial salts ($Li_2C_xO_y$) claimed in this invention include, but are not limited to Salt 1: Dilithium Squarate (Theoretical Capacity: 440 mAh/g)

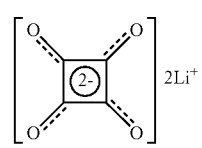

Salt 2: Dilithium Ketomalonate (Theoretical Capacity: 430 mAh/g)

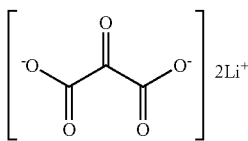

and Salt 3: Dilithium Oxalate (theoretical capacity: 545 mAh/g)

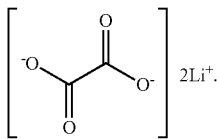

The sacrificial salts are added to the cathodes as functional additives for the (electrochemical) prelithiation. The mechanism is based on the oxidation of sacrificial salts:

$$Li_2C_xO_y \rightarrow y/2 CO_2 + (x-y/2)C + 2e^- + 2Li^+ \quad (1)$$

Figure 3:
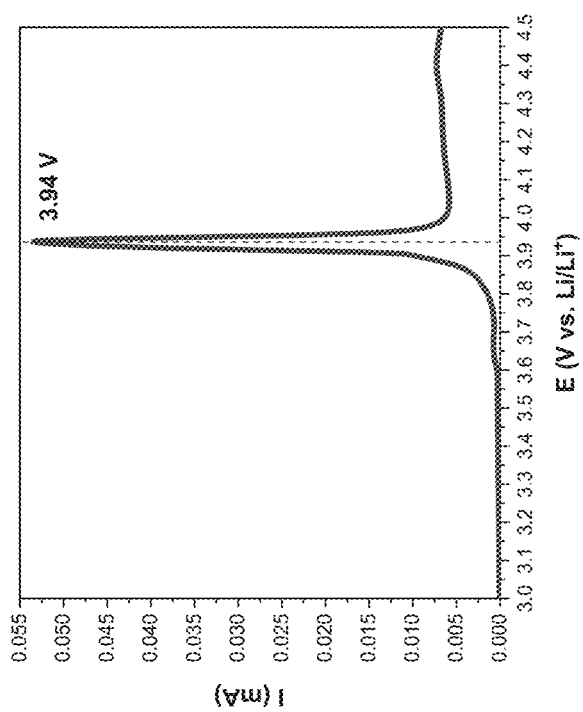
FIG. 3 shows Linear Sweep Voltammetry from 3.0V to 4.5V @0.05 mV/s for Salt 1 (dilithium squarate)-Li coin cell at room temperature, in accordance with an example embodiment of the disclosure.

FIG. 3 demonstrates the oxidation reaction of salts (example: dilithium squarate). The oxidation peak of dilithium squarate in Linear Sweep Votametry (LSV) is at 3.94 V vs. Li/Li+, indicating the reaction (prelithiation mechanism) as shown in Equation (1) above.

Sacrificial Salt Preparation: Dilithium Squarate ($Li_2C_4O_4$) is synthesized by adding stoichiometric amounts of squaric acid and lithium bicarbonate in water [Shanmukaraj et al]. Dilithium ketomelonate is synthesized using method described in the literature [Id]. The salt is obtained after evaporation of water under 60° C. Dilithium oxalate ($Li_2C_2O_4$) is obtained from Alfa Aesar.

Sacrificial salt-Carbon-binder based Electrode Preparation: Sodium alginate (10% by weight) solution in water is prepared by mixing in a centrifugal planetary mixer at 700-900 rpm for 15-45 mins. Ketjen Black® is added in this mixture and dispersed under 900-1100 rpm for 5-15 mins. Finally, salt dissolved in water is added in the slurry and dispersed under 900-1100 rpm for 5-15 mins. The final solid content ratio is maintained 1:1:1 for ketjen black: binder: salt. The slurry is allowed to reach room temperature and manually coated on Al foil using coating applicator and dried at 80-120° C. overnight.

Coin Cell Assembly: Coin cells are prepared using the punched electrodes (16 mm diameter) in coin half cells and tested against Li electrode. The electrolyte used is FEC/EMC (3/7 by weight) with 1.0-1.4M of $LiPF_6$.

NCM622-Sacrificial Salt Cathode Preparation: Super P is added to 4.5% of PVDF in NMP. After hand mixing with a spatula they are dispersed in a centrifugal planetary mixer at 2000 rpm for 1 minute. Next, cathode active material is added and hand mixed with a spatula and then dispersed at 2000 rpm for 1 minute. NMP is added to keep the slurry solids content to 50% and dispersed at 2000 rpm for 1 minute. Finally, finely ground dilithium salt is added in the slurry and dispersed at 2000 rpm for 2 minutes. The final formulation is 88% active material, 4% PVDF, 3% super P and 5% dilithium salt. The slurry is coated on 12 μm Al foil and dried under vacuum at 80° C. overnight or over a similar period of time before punching for use in coin cells.

Figure 4:
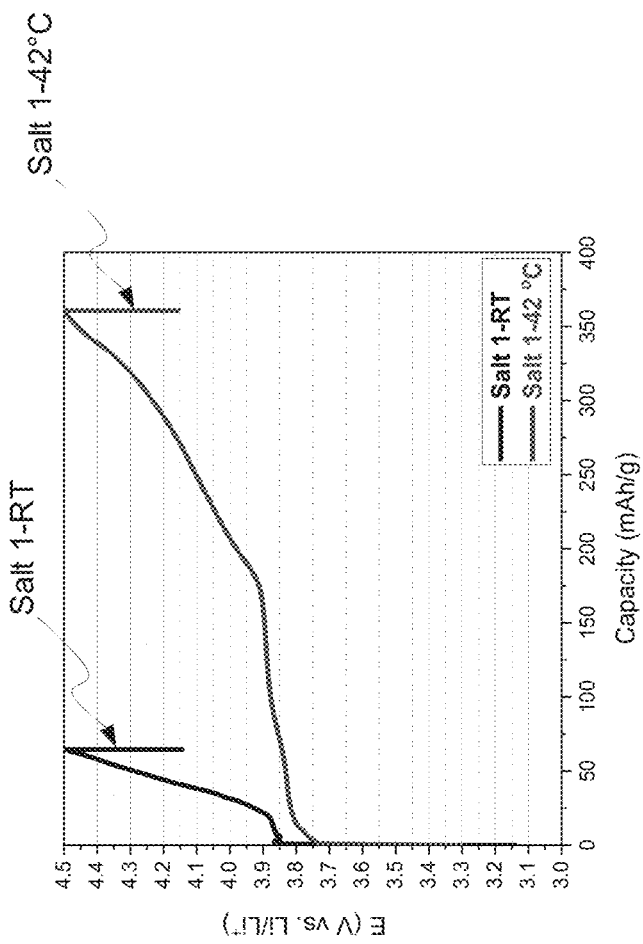
FIG. 4 shows Li coin cell data for specific capacity obtained from oxidation of the salt at different temperatures for Salt 1 (dilithium squarate), in accordance with an example embodiment of the disclosure.
Figure 5:
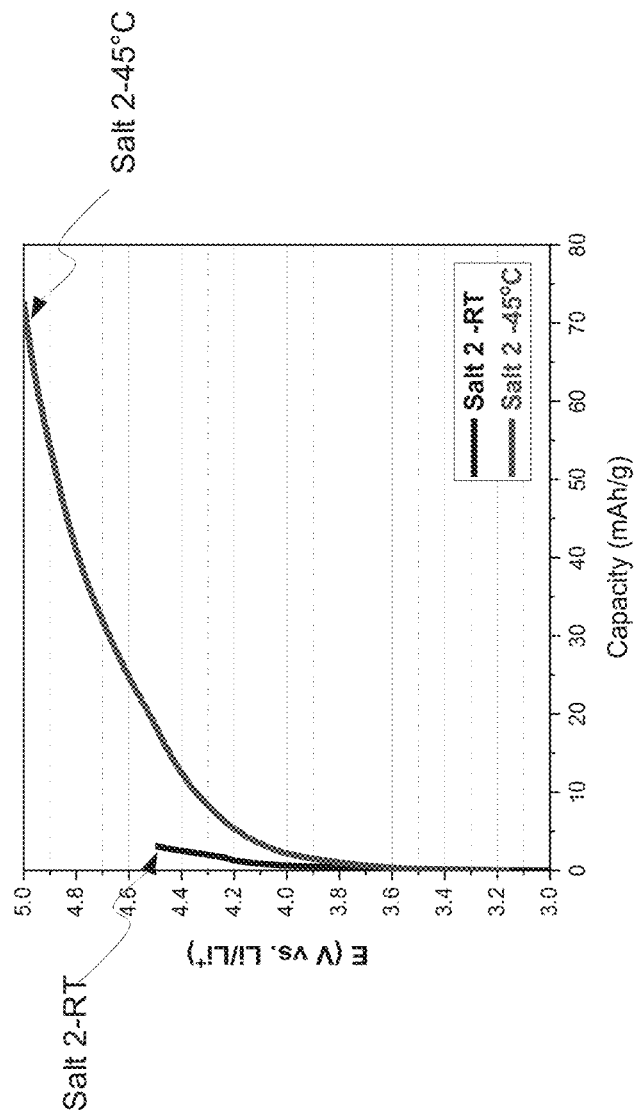
FIG. 5. shows Li coin cell data for specific capacity obtained from oxidation of the salt at different temperatures for Salt 2 (dilithium ketomalonate), in accordance with an example embodiment of the disclosure.
Figure 6:
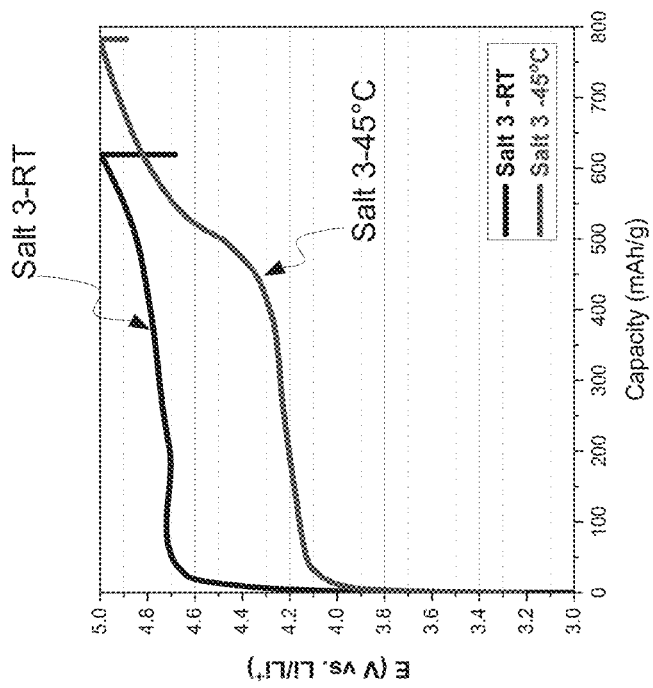
FIG. 6 shows Li coin cell data for specific capacity obtained from oxidation of the salt at different temperatures for Salt 3 (dilithium oxalate), in accordance with an example embodiment of the disclosure.

FIGS. 4-6 further show the voltage profile of initial charging for three salt-based cells at a constant current (C/20). The Salt 1 based cell (FIG. 4) shows a charge (oxidation) plateau at ~3.8-3.9V vs. Li/Li+, in a good agreement with the oxidation peak in LSV (FIG. 3). Moreover, FIG. 4-6 also validate the temperature effect on the oxidation reaction of salts. When the temperature is increased from room temperature (RT) to about 42-45° C., the charge capacity (related to the oxidation reaction of salts) is significantly increased (approaching to their theoretical capacities except for Salt 2), and further the plateau voltage is decreased, particular for Salt 3 (FIG. 6) in which the charge voltage significantly decreased from ~4.7 to ~4.2 V vs. Li/Li+.

Thus there is clearly a temperature effect on the capacity (increase) and voltage (decrease) of salt oxidation reaction. In some embodiments, the operation temperature of the sacrificial salts based prelithiation approach is between 40-45° C.

Figure 7:
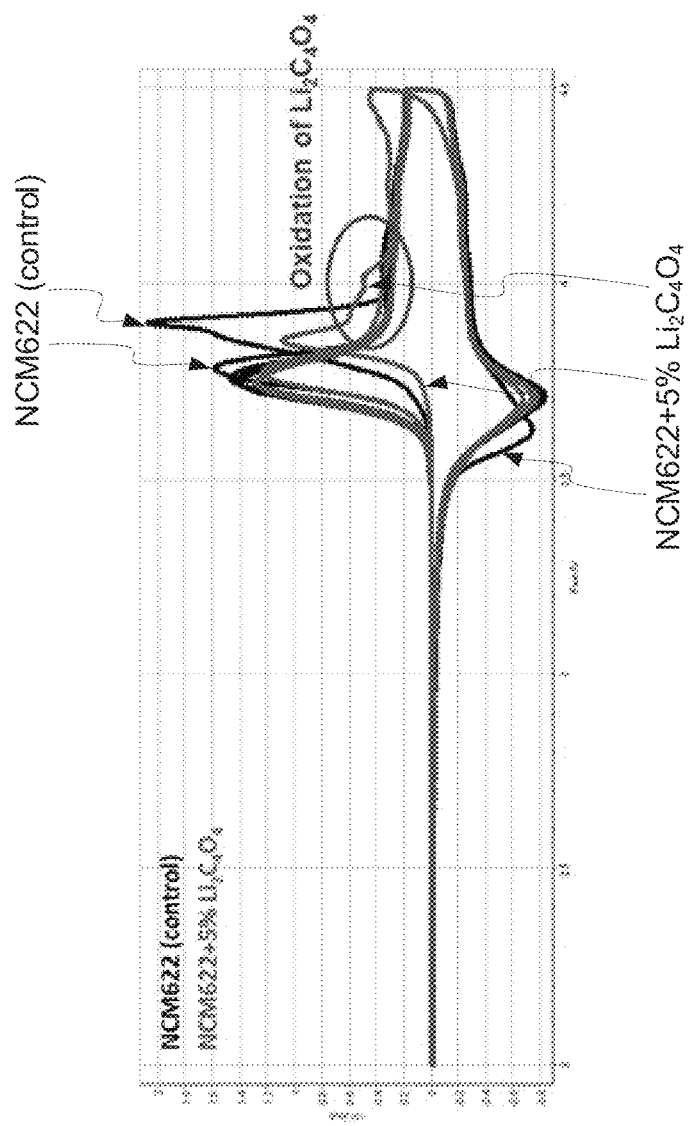
FIG. 7 shows a NCM622-Li half coin cell data using NCM622 as cathode active material with 5% dilithium squarate (Salt 1), in accordance with an example embodiment of the disclosure.

FIG. 7 demonstrates the dilithium salt effect (on prelithiation) when they are introduced to the cathode. For example, the Salt 1 contained cathode shows an extra oxidation peak between 3.9-4.0V vs. Li/Li+ compared with the control, indicating the oxidation reaction of the salt to generate extra Li+ for prelithiation. The experiment from FIG. 7 utilizes a NCM622-Li half coin cell having NCM622 as cathode active material with 5% dilithium squarate (Salt 1). The electrolyte used is FEC/EMC (3/7 by weight) with 1.2M of $LiPF_6$. Cyclic Voltammetry is from 2.0V to 4.5V @0.05 mV/s.

Figure 8B:
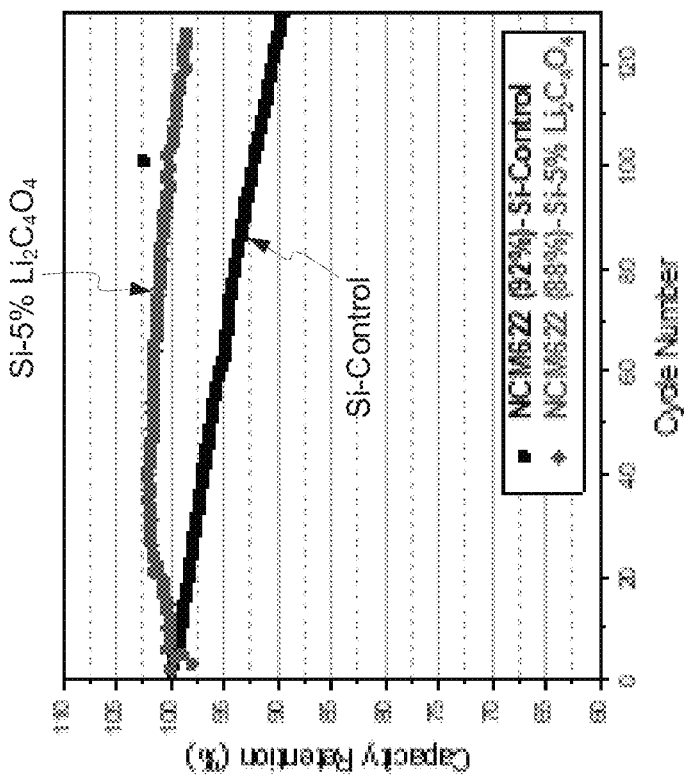
FIG. 8A and FIG. 8B show the cycling performance of NCM622-Si full coin cell using NCM622 as cathode active material with 5% dilithium squarate (Salt 1) using the electrolyte FEC/EMC, in accordance with an example embodiment of the disclosure.
Figure 8A:
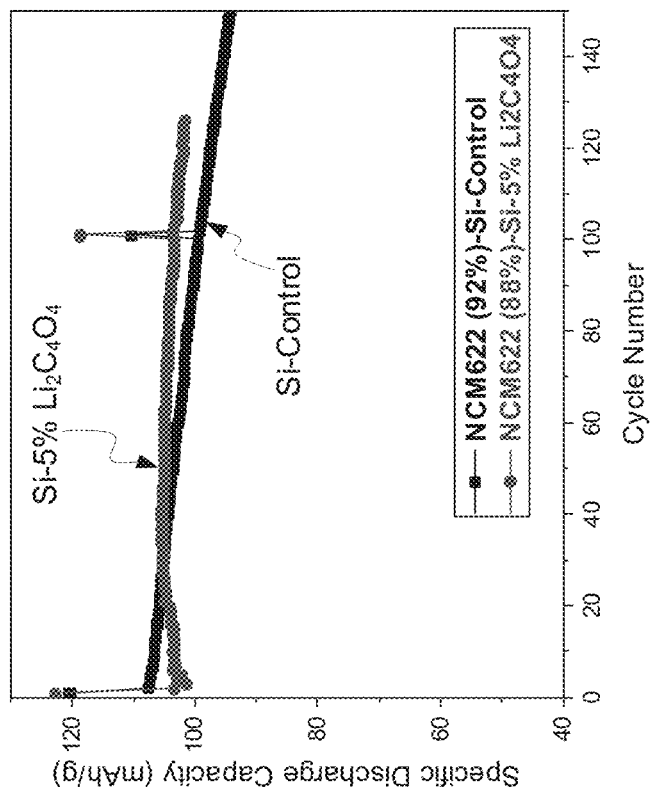
Figure 9B:
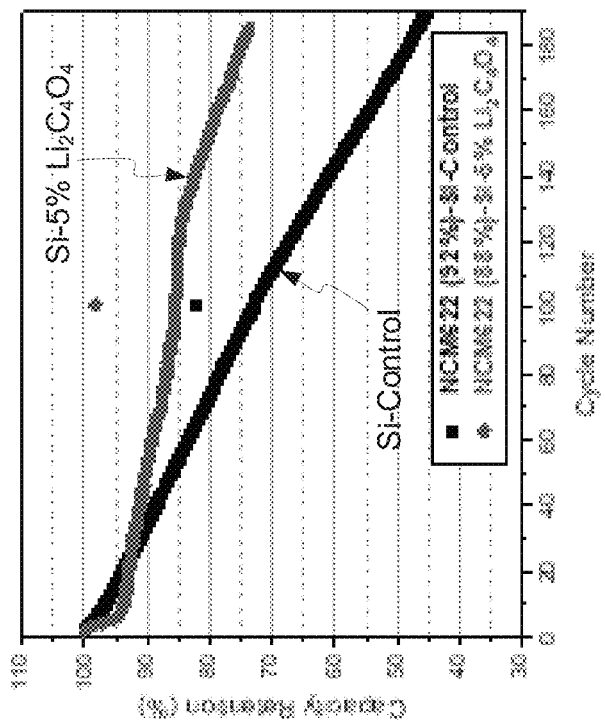
FIG. 9A and FIG. 9B shows the cycling performance of NCM622-Si full coin cell using NCM622 as cathode active material with 5% dilithium squarate (Salt 1) using the electrolyte EC/EMC, in accordance with an example embodiment of the disclosure.
Figure 9A:
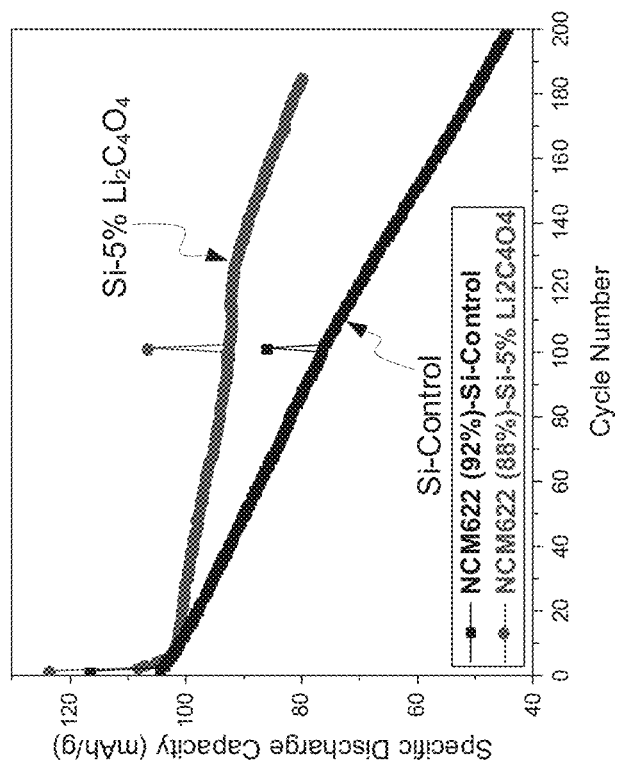

FIGS. 8 and 9 demonstrate the prelithiation benefit from sacrificial salts on the cycle life performance. The capacity retention of salt contained full cell is significantly improved compared with that of the control cell (no salt) in different electrolyte solutions. As shown in FIG. 8 (FEC/EMC based electrolyte solution), the capacity retention is increased from 90.0% to 98.5% after 125 cycles when 5% Salt 1 is added; and as shown in FIG. 9 (EC/EMC based solution), the capacity retention is even more notably increased from 65.8% to 84.7% after 125 cycles (and further increased from 46.7% to 73.7% after 185 cycles) with the addition of Salt 1.

The embodiment from FIG. 8 utilizes a NCM622-Si full coin cell using NCM622 as cathode active material with 5% dilithium squarate (Salt 1). The electrolyte used is FEC/EMC (3/7 by weight) with 1.2M of $LiPF_6$. The embodiment from FIG. 9 utilizes a NCM622-Si full coin cell using NCM622 as cathode active material with 5% dilithium squarate (Salt 1). The electrolyte used is EC/EMC (3/7 by weight) with 1.2M of $LiPF_6$.

Detailed Test Procedure for FIGS. 8 and 9: 1 C (4.2V)/0.5 C (3.1V). Full coin cells are charged at C/50 to 4.2V at 42 C and then discharged at 2.0 C at C/5 and then charged to 3.3V at C/20 at room temperatures. Subsequent cycles are done at room temperature at 1 C to 4.2V and then 0.5 C to 3.1V.

In a further embodiment, the prelithiation reagent, $Li_5FeO_4$ (LFO) is used to mitigate Li ion inventory loss to the cathode. LFO is effective with graphite anodes and may be used as a prelithiation source for Si anodes. LFO is a Li-rich cathode material and has highly anionic redox reactivity. This defect anti-fluorite compound can be considered as an anionic-redox-based cathode and pre-lithiation agent.

Figure 10:
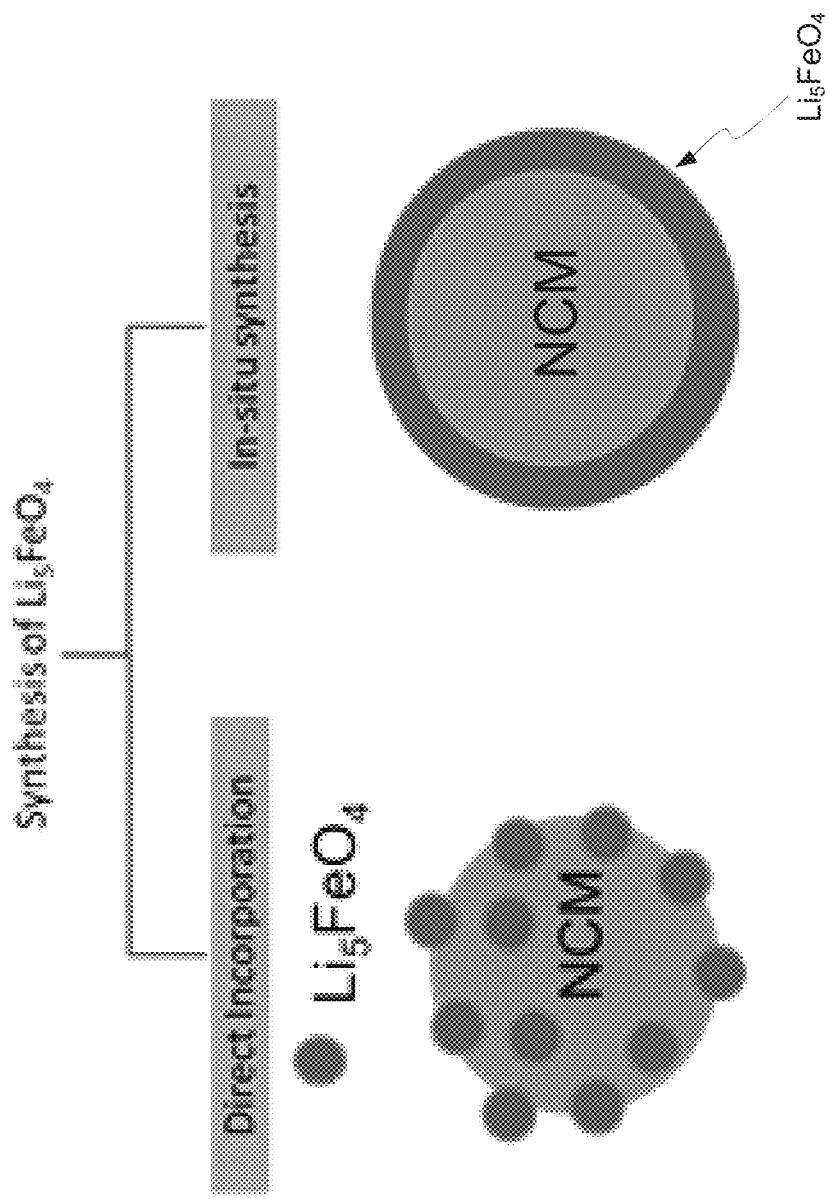
FIG. 10 illustrates a synthesis route to synthesize LFO on the surface of cathode particles, in accordance with an example embodiment of the disclosure.

LFO may be introduced as an additive in the cathode, which can lead to low energy density due to the presence of bi-products within cathode matrix. Additionally, the particle size of the starting material, $Fe_3O_4$ is one of the factors to determine the reactivity of LFO. Bulk synthesis of LFO involves decreasing particle size in intermediate milling/grinding steps. Moreover, the conventional solid-state reaction used to prepare LFO utilizes the treatment of starting material at an elevated temperature. At high temperature conditions, Li tends to evaporate before the formation of LFO leading low stoichiometric Li ion in LFO. In accordance with an embodiment of the disclosure, a LFO cathode core-shell structure is utilized, where the core is the cathode particle and the shell consists of a LFO layer, which allows for efficient initiation of the delithiation of LFO on the surface of cathode. This method minimizes Li loss since a solvent-based synthesis route is utilized to synthesize LFO on the surface of cathode particles (See FIG. 10). In certain embodiments, the thickness of the LFO layer is submicron or nanometer in scale. In other embodiments, LFO has a thin film structure with a high Si content anode, where Si content is >50%. This embodiment limits the detrimental effect caused by the sensitivity of LFO to moisture and carbon dioxide, when handling bulk LFO particles and dispersing them in a cathode matrix.

In a further embodiment, high capacity and low voltage cathodes can be used to provide an extra lithium source in the cathode and mitigate the loss of active material during initial cycling. In general, use of such a prelithiation source in the cathode provides an effective route to compensate the large initial lithium loss of high-capacity anode materials and improves the electrochemical performance of existing lithium-ion batteries. Specifically, multilayer encapsulated sacrificial salts are used as the prelithiation source. These salts include, but are not limited to $Li_2S$, $Li_2Te$ and $Li_2Se$.

Figure 11:
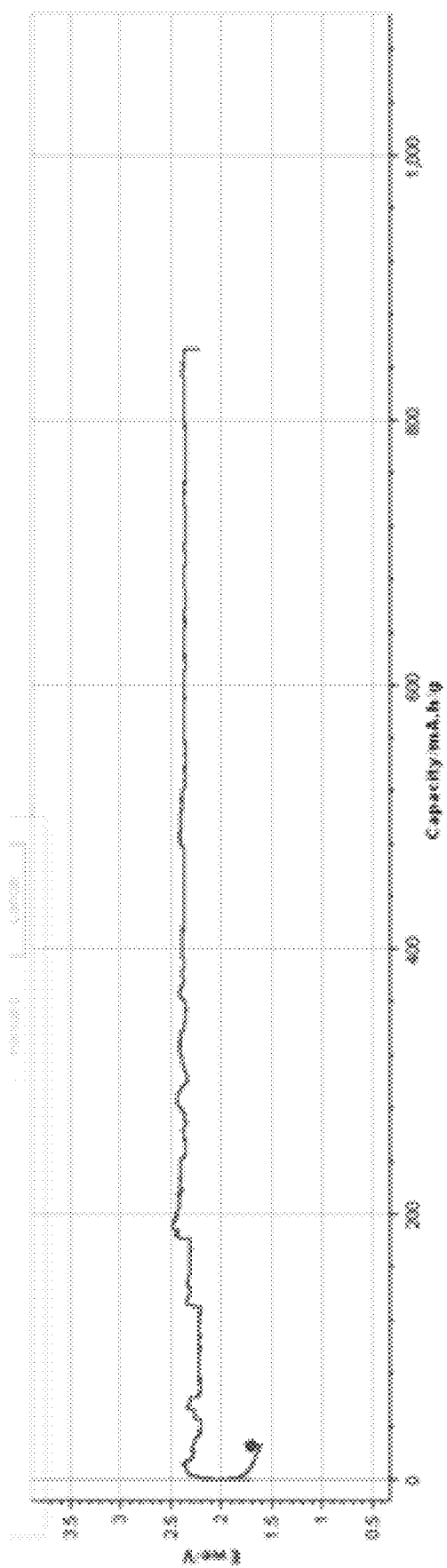
FIG. 11 shows a voltage profile demonstrating the capacity of the neat $Li_2S$ electrode with 70% Li2S:20% SP:10% PVDF, in accordance with an example embodiment of the disclosure.

FIG. 11 shows the voltage profile of a half cell using Li metal as and anode and a $Li_2S$ cathode (70% $Li_2S$, 20% carbon, 10% PVDF binder) $Li_2S$ can provide up to >800 mAh/g of capacity at low voltages 2.4V versus $Li_0/Li+$ during charge and less than 50 mAh/g during discharge which makes it a suitable lithium salt for prelithiation.

Figure 12:
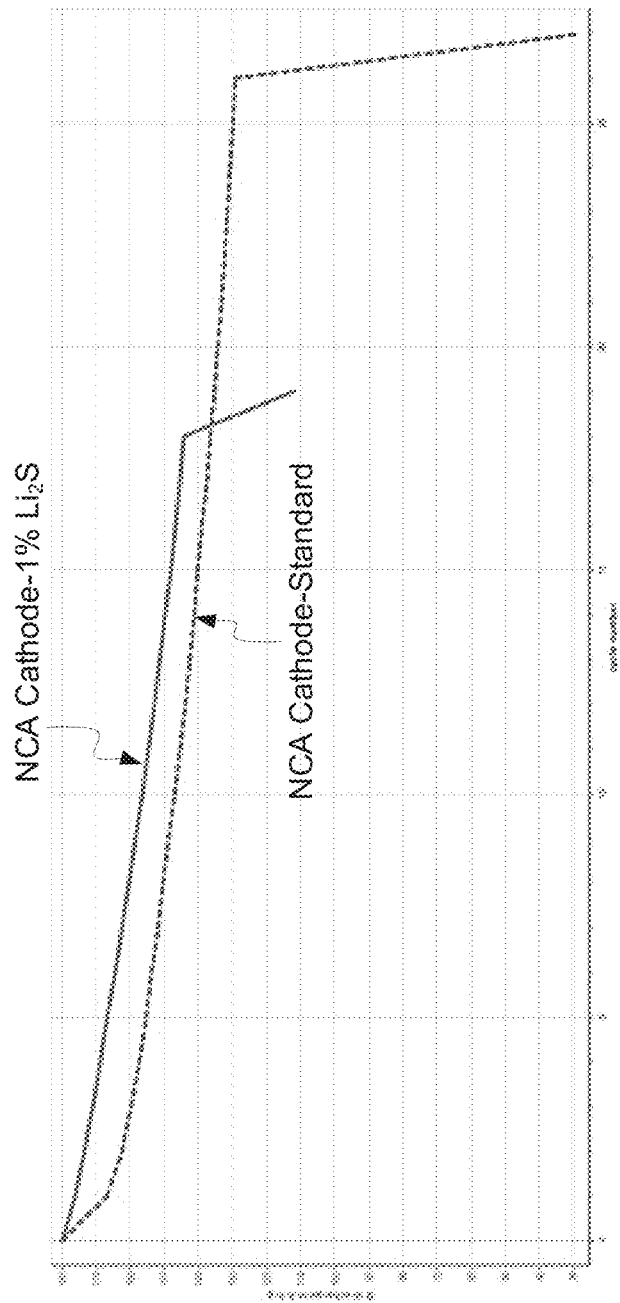
FIG. 12 shows the initial cycle performance of the NCA cathode with (1%, solid) and without (standard, dashed) $Li_2S$ as prelithiation source versus lithium, in accordance with an example embodiment of the disclosure.

FIG. 12 shows the initial cycle performance of the NCA cathode with and without $Li_2S$ as prelithiation source versus lithium which demonstrates that the cell with $Li_2S$ shows better capacity retention than the standard cell. This specifically avoids loss of lithium from the active material which causes reduction in energy density, cell capacity and cycle life.

Figure 13:
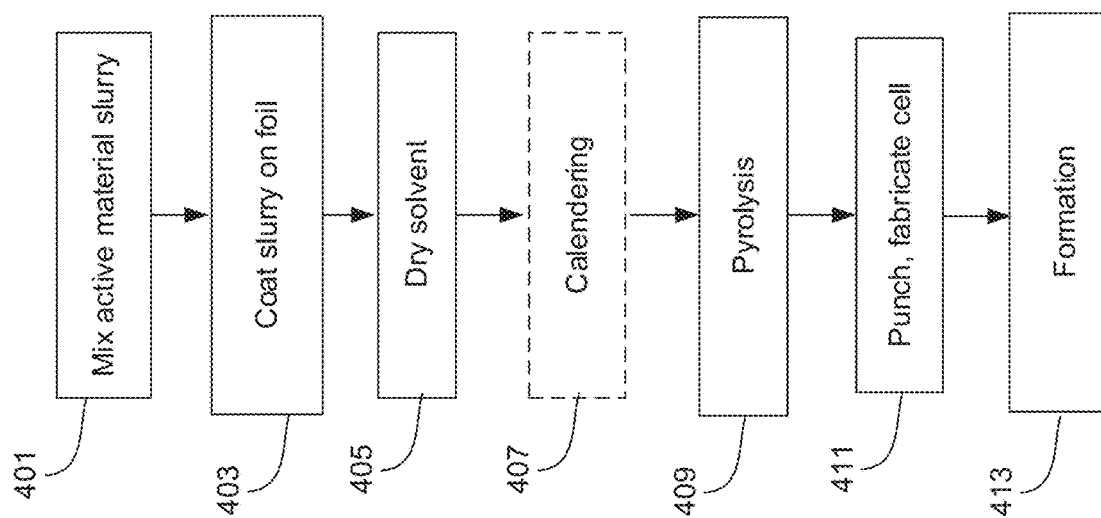
FIG. 13 is a flow diagram of a process for direct coating electrodes, in accordance with an example embodiment of the disclosure.

FIG. 13 is a flow diagram of a process for direct coating electrodes, in accordance with an example embodiment of the disclosure. This process comprises physically mixing the active material, conductive additive, and binder together, and coating it directly on a current collector. This example process comprises a direct coating process in which an anode slurry is directly coated on a copper foil using a binder such as CMC, SBR, Sodium Alginate, PAI, PAA, PI and mixtures and combinations thereof. Another example process comprising forming the active material on a substrate and then transferring to the current collector is described with respect to FIG. 14.

In step 401, the raw electrode active material may be mixed using a binder/resin (such as PI, PAI), solvent, and conductive carbon. For example, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size, may then be dispersed in polyamic acid resin (12-18% solids in N-Methyl pyrrolidone (NMP)) at, e.g., 1800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 25-35%. The particle size and mixing times may be varied to configure the active material density and/or roughness.

In step 403, the slurry may be coated on the foil at a loading of, e.g., 3-4 mg/cm$^2$, which may undergo drying in step 405 resulting in less than 13-20% residual solvent content. In step 407, an optional calendering process may be utilized where a series of hard pressure rollers may be used to finish the film/substrate into a smoother and denser sheet of material.

In step 409, the active material may be pyrolyzed by heating to 500-800 C such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis can be done either in roll form or after punching in step 411. If done in roll form, the punching is done after the pyrolysis process. The punched electrode may then be sandwiched with a separator and cathode with electrolyte to form a cell. In step 413, the cell may be subjected to a formation process, comprising initial charge and discharge steps to lithiate the anode, with some residual lithium remaining.

Figure 14:
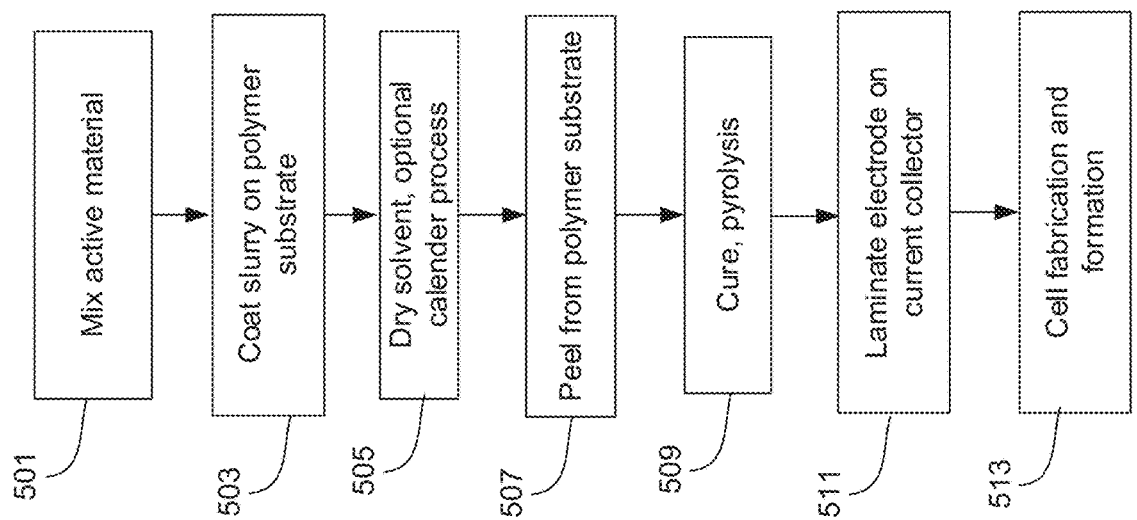
FIG. 14 is a flow diagram of an alternative process for lamination of electrodes, in accordance with an example embodiment of the disclosure.

FIG. 14 is a flow diagram of an alternative process for lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 14, starting with step 501 where the active material may be mixed with a binder/resin such as polyimide (PI) or polyamide-imide (PAI), solvent, the silosilazane additive, and optionally a conductive carbon. As with the process described in FIG. 13, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size, may then be dispersed in polyamic acid resin (10-20% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 503, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 13-20% solvent content), and then dried to remove a portion of the solvent in step 505. An optional calendering process may be utilized where a series of hard pressure rollers may be used to finish the film/substrate into a smoothed and denser sheet of material.

In step 507, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 509 where the film may be cut into sheets, and vacuum dried using a two-stage process (100-140° C. for 15 h, 200-240° C. for 5 h). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In step 511, the pyrolyzed material may be flat press or roll press laminated on the current collector, where a copper foil may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 513, the electrode may then be sandwiched with a separator and cathode with electrolyte to form a cell. The cell may be subjected to a formation process, comprising initial charge and discharge steps to lithiate the anode, with some residual lithium remaining.

Several advantages are brought about by the prelithiation process of the present disclosure. For example, the prelithiation method is safe and uses sacrificial salts that are easy to handle compared to unstable chemical/electrochemical prelithiation reported previously in the literature (e.g. Lithium metal, stabilized lithium metal powder etc.). The method disclosed also allows for first cycle charging at temperatures higher than room temperature, which lowers oxidation potential thereby allowing prelithiation where the cathode voltage is in a stable operating window (see FIGS. 4-6). When a first oxidation cycle is performed at higher temperatures (e.g. higher than room temperature) this reduces the oxidation potential of the salts thus making the potential window compatible with more cathode materials. Additionally, cycle life is improved due to the Li reservoir generated at first charge cycle without sacrificing energy density, as demonstrated in FIGS. 8 and 9.

Embodiments of the present disclosure illustrate that sacrificial salts added to the cathode as functional additives for prelithiation are beneficial. In other embodiments, salts may be added to the anode for prelithiation as well. For example, in one embodiment, the instant sacrificial cathode concept is applied to prelithiation of Si anodes at the first charge. Penta-molar Li containing Li$_5$FeO$_4$ is chosen as the prelithiation material as it has 867 mAh/g of theoretical capacity when it is oxidized to 4.9V. To make Li$_5$FeO$_4$ LiOH·H$_2$O and Fe$_2$O$_3$ are mixed at the ratio of Li:Fe=5:1 and 6:1, then the mixed power is ball milled for 30 min in Spex mill and then made pellets at 6.1~6.3 ton of pressure. The pellets are successfully synthesized at 850° C. for 20 hours. PXRD data confirmed the 6:1 mixture has the structure of Li$_5$FeO$_4$. Other Li containing materials may also be used. In general, highly irreversible Li containing materials can be used to transfer Li to Si anode at the first charge, leaving irreversible Li at the anode side to stabilize the anode.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

REFERENCES a. Shanmukaraj et al. Sacrificial salts: Compensating the initial charge irreversibility in lithium batteries. Electrochemistry Communications 12 (2010) 1344-1347.
b. Holtstiege, Florian & Bärmann, Peer & Nölle, Roman & Winter, Martin & Placke, Tobias. (2018). Pre-Lithiation Strategies for Rechargeable Energy Storage Technologies: Concepts, Promises and Challenges. Batteries. 4. 4. 10.3390/batteries4010004.

The invention claimed is:

1. A battery, the battery comprising:
a cathode, an electrolyte solution, and an anode, wherein said cathode comprises an active material, a prelithiation agent in the form of one or more sacrificial lithium salts, and a polymer binder;
wherein said one or more sacrificial lithium salts comprises dilithium ketomalonate at a concentration of 5% by weight;
wherein said battery comprises a silicon-dominant anode having Si content of >50%; and wherein said Si is present as silicon particles.

2. The battery according to claim 1, wherein the prelithiation agent in the form of one or more sacrificial lithium salts irreversibly provides lithium to the anode during charge.

3. A battery, the battery comprising:
a cathode, an electrolyte solution, and an anode, wherein said anode has been prelithiated using one or more sacrificial lithium salts;
wherein said cathode comprises an active material, a prelithiation agent in the form of said one or more sacrificial lithium salts, and a polymer binder;
wherein said one or more sacrificial lithium salts comprises dilithium ketomalonate at a concentration of 5% by weight;
wherein said battery comprises a silicon-dominant anode having Si content of >50%; and wherein said Si is present as silicon particles.

4. A method of forming a battery, the method comprising:
forming a battery comprising a cathode, an electrolyte solution, and an anode, the cathode comprising one or more sacrificial lithium salts; wherein said cathode is formed using, at least, the following steps:
cathode material is mixed to create a slurry
said sacrificial lithium salt is added to said slurry
said slurry is coated on metal foil; and
the coated metal foil is dried;
   wherein said one or more sacrificial lithium salts comprises dilithium ketomalonate at a concentration of 5% by weight;
   wherein said slurry also comprises a polymer binder;
   wherein said battery comprises a silicon-dominant anode having Si content of >50%; and wherein said Si is present as silicon particles.

5. The method of claim 4, wherein a first oxidation cycle of said battery is performed at higher than room temperature to reduce the oxidation potential of said one or more sacrificial lithium salts.

* * * * *